(12) United States Patent
Aneppanavar et al.

(10) Patent No.: US 10,423,591 B2
(45) Date of Patent: Sep. 24, 2019

(54) MODEL FILE GENERATOR

(71) Applicants: Dhaneshwari Aneppanavar, Bangalore Karnataka (IN); Senthamarai Vilvanathan, Bangalore Karnataka (IN)

(72) Inventors: Dhaneshwari Aneppanavar, Bangalore Karnataka (IN); Senthamarai Vilvanathan, Bangalore Karnataka (IN)

(73) Assignee: Unisys Corporation, Blue Bell, PA (US)

( * ) Notice: Subject to any disclaimer, the term of this patent is extended or adjusted under 35 U.S.C. 154(b) by 208 days.

(21) Appl. No.: 15/194,727

(22) Filed: Jun. 28, 2016

(65) Prior Publication Data

US 2017/0308544 A1    Oct. 26, 2017

(51) Int. Cl.
| | | |
|---|---|---|
| G06F 17/30 | (2006.01) | |
| G06F 16/21 | (2019.01) | |
| G06F 11/36 | (2006.01) | |

(52) U.S. Cl.
CPC ............ *G06F 16/212* (2019.01); *G06F 11/36* (2013.01)

(58) Field of Classification Search
CPC .................................................. G06F 17/30115
USPC ........................................................... 707/821
See application file for complete search history.

(56) References Cited

U.S. PATENT DOCUMENTS

| | | | |
|---|---|---|---|
| 2003/0004971 A1* | 1/2003 | Gong | G06Q 10/087 |
| 2003/0011627 A1* | 1/2003 | Yager | G06F 3/14 |
| | | | 715/700 |
| 2009/0064096 A1* | 3/2009 | Goebel | G06F 11/3636 |
| | | | 717/106 |
| 2010/0324398 A1* | 12/2010 | Tzyy-Ping | A61B 5/14532 |
| | | | 600/365 |
| 2015/0301108 A1* | 10/2015 | Hamid | G01R 31/3177 |
| | | | 714/724 |

* cited by examiner

*Primary Examiner* — Hicham Skhoun

(57) ABSTRACT

Apparatuses, systems, and methods that generate a model file with a plurality of components. In one embodiment, a method includes reading, by a processor, an input model file. The method includes extracting, by the processor, at least one input component from the input model file. The method includes generating, by the processor, at least one output component using the at least one input component. The method includes storing, by the processor, the at least one output component in an output model file.

20 Claims, 7 Drawing Sheets

MODEL FILE GENERATOR

FIELD OF THE DISCLOSURE

The instant disclosure relates generally to database management. More specifically, this disclosure relates to methods, apparatuses, and systems that generate model file for various end point applications.

BACKGROUND

A model file can be loaded by a database to present the data stored in the model file with the graphical user interface specified in the model file. The size of a model file varies. A model file with a relatively larger size may cause database errors that a relatively smaller size may not. The embodiments of the invention disclosed herein describe various apparatuses, methods, and systems that may generate model files with desired sizes for various end point applications, e.g., database testing, database debugging, software quality control, or the like.

SUMMARY

The instant disclosure relates generally to database management. More specifically, this disclosure relates to methods, apparatuses, and systems that generate model file for various end point applications. According to one embodiment, a method includes reading, by a processor, an input model file. The method further includes extracting, by the processor, at least one input component from the input model file. The method further includes generating, by the processor, at least one output component using the at least one input component. The method further includes storing, by the processor, the at least one output component in an output model file.

According to another embodiment, a computer program product includes a non-transitory computer-readable medium comprising instructions which, when executed by a processor of a computing system, cause the processor to perform the steps of: reading an input model file; extracting at least one input component from the input model file; generating at least one output component using the at least one input component; and storing the at least one output component in an output model file.

According to another embodiment, an apparatus comprises a memory and a processor coupled to the memory. The processor is configured to execute the steps of reading an input model file; extracting at least one input component from the input model file; generating at least one output component using the at least one input component; and storing the at least one output component in an output model file.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

DETAILED DESCRIPTION

Figure 1:
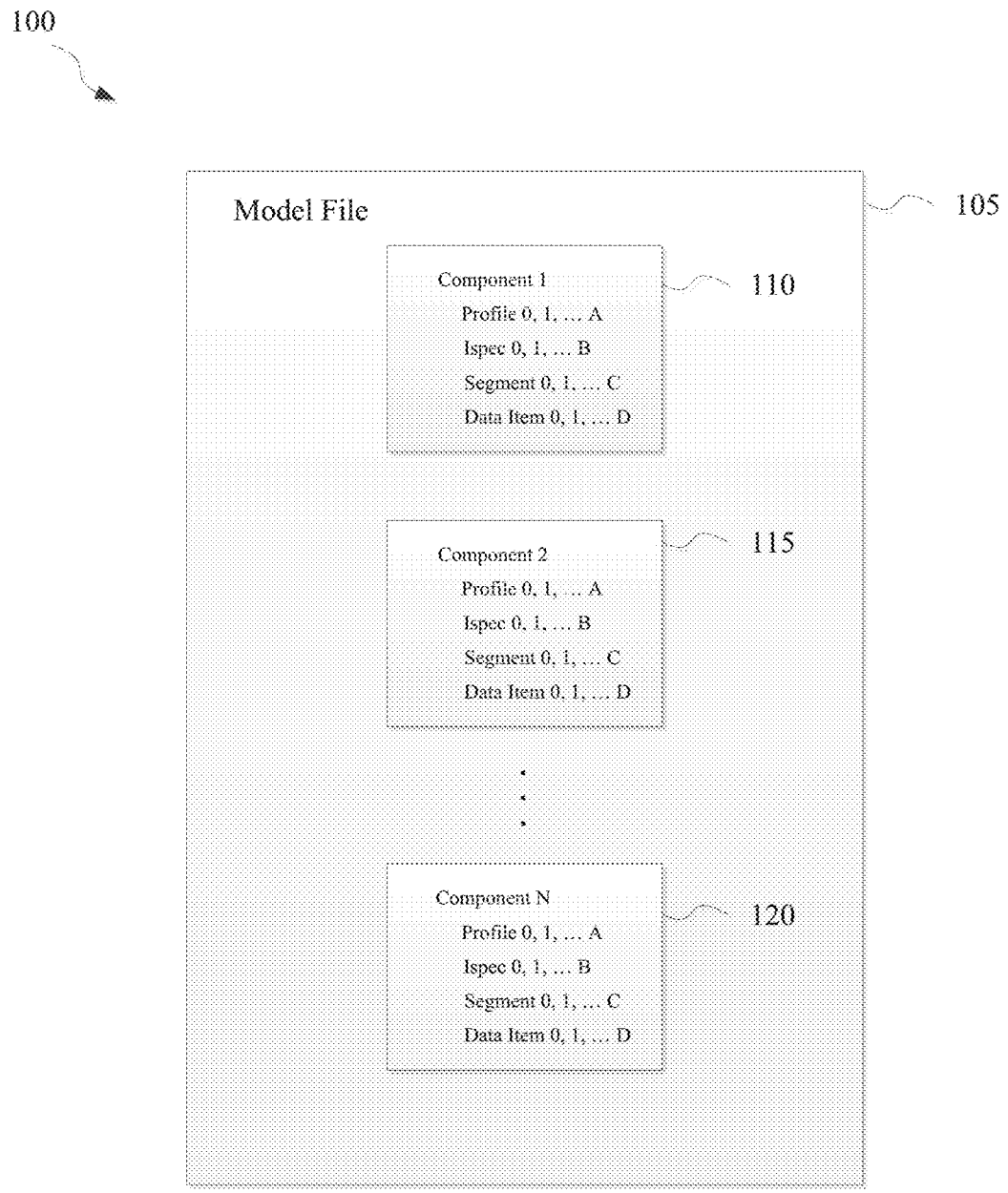
FIG. 1 is a schematic drawing illustrating a model file according to one embodiment of the disclosure.

The term "operating system" means a set of instructions that can be executed by a processor of a computer. An operating system supports the basic functionalities of a computer. An operating system may be an emulated operating system or a non-emulated operating system, for example, OS 2200, Eclipse 2200, System Architecture Interface Layer (SAIL), Linux, Windows, Java, Unix, or the like.

The term "instruction" means a processor-executable instruction, for example, an instruction written as programming codes. An instruction may be executed by any suitable processor, for example, x86 processor. An instruction may be programmed in any suitable computer language, for example, machine codes, assembly language codes, C language codes, C++ language codes, Fortran codes, Java codes, Matlab codes, or the like.

A "computer-readable medium" holds the data in a data storage medium for a period of time that is not transient. The term computer-readable medium may be used interchangeably with non-transient computer-readable medium. A computer-readable medium may be volatile memory that loses its memory when power is off, e.g., random access memory (RAM), dynamic random access memory (DRAM), etc. A computer-readable medium may be non-volatile memory that does not lose its memory when power is off, e.g, hard disk, flash memory, optical disk, magnetic tape, etc. Computer-readable medium includes, e.g., random access memory (RAM), dynamic random access memory (DRAM), read only memory (ROM), electrically erasable programmable read-only memory (EEPROM), Flash memory, NAND/NOR gate memory, hard disk drive, magnetic tape, optical disk, compact disk (CD), or the like.

A "database" is a set of data with a certain structure stored in a computer-readable medium. The structure of a database may include columns and rows. The structure of a database may be static or dynamic. Various tasks may be performed on the data stored in a database, e.g., read, write, modify, move, copy, delete, or the like. Various tasks may further include: record insertion into database, database record deletion, database record modification, adding database structure, deleting database structure, modifying database structure, database dump, database online and/or offline reorganization, database recovery, database quiesce, or the like.

A "model file" is a file that includes database attributes. A model file is loadable by a compatible database. A model file may resemble the concept of an "object" in Visual Basic language; a "class" in C language, or the like. A model file can be defined by a user/developer to include different database attributes, e.g., components, profiles, Ispecs, segments, data items, or the like. In some other embodiments, data attributes in a model file may include graphical user interface, database size, database structure, file input/output control, profile, comments, or the like.

A "component" of a model file is a collection of database attributes. A component may include a business resource such as a customer, product, vendor, or the like. A component may be a storage of data about a business resource such as a customer, product, vendor, or the like. A component may include screen layout and associated operational logics (e.g., Pre-Screen logic, Pre-LINC logic, and Main logic).

A "profile" is a database attribute within a component. In one embodiment, a profile is a business profile over a component. In one embodiment, a profile may include address, phone number, name of the CEO, and/or a description of the nature of the business of a client.

A "segment" is a database attribute within a component. In one embodiment, a segment may refer to a data segment (table data storage), an index segment, a rollback segment, a temporary segment, or the like.

An "Ispec" is a database attribute within a component. Ispec is a contraction of the term interface specification. Ispec may include specifications of graphical user interface, screen size, window location, input/output buttons, drop downs, database structure, business logic, or the like.

A "data item" is a database attribute within a component. A data item may be a data record of a database.

For a more complete understanding of the disclosed systems and methods, reference is now made to the following descriptions taken in conjunction with the accompanying drawings.

FIG. 1 is a schematic drawing illustrating a model file 100 according to one embodiment. The model file 105 may be included in the system 200 in FIG. 2. In some embodiments, the model file 105 may be the input model file of 205 and/or the output model file of 215 in FIG. 2. The model file 105 may be included in the method 300 in FIG. 3. In some embodiments, the model file 105 may be the input model file at block 310 and/or the output model file at 340 in FIG. 3. The model file 105 may be included in the method 400 in FIG. 4. In some embodiments, the model file 105 may be the model file at 410. The model file 105 may be included in the system 500 in FIG. 5. In one embodiment, the model file 105 may be stored in the data storage 506. The model file 105 may be included in the computer system 600 in FIG. 6. In some embodiments, the model file 105 may be stored at data storage 612. The model file 105 may be included in the server 700 in FIG. 7A. In one embodiment, the model file 105 may be loaded in an emulated environment 704 The model file 105 may be included in the server 750 in FIG. 7B. In one embodiment, the model file 105 may be executed by the CPU 703.

As shown in 1, a model file 105 includes a plurality of components 110, 115, and 120. In FIG. 1, N may be any positive integer. In one embodiment, a model file 105 may include just one component (N=1). In another embodiment, a model file 105 may include a relatively small number of components, e.g., less than ten (N<10). In yet another embodiment, a model file 105 may include a relatively large number of components, e.g., more than ten (N>10). It is noted that there is no limitation on the number of components that a model file may include.

In one embodiment, for the purpose of an end point application, e.g., 220, 225, or 230, the model 105 file may only need one component. In another embodiment, for the purpose of an end point application, e.g., 220, 225, or 230, the model 105 file may need tens of components. In another embodiment, for the purpose of an end point application, e.g., 220, 225, or 230, the model 105 file may need hundreds of components. In another embodiment, for the purpose of an end point application, e.g., 220, 225, or 230, the model 105 file may need thousands of components.

As shown in FIG. 1, the components 100, 115, and 120 include profile, Ispec, segment, and/or data item. In FIG. 1, constant A, B, C, and D may be any positive integer. It is noted that every element (i.e., profile, Ipsec, segment, and data item) can be optional. A user of the model file 105 may arbitrarily define what is included in a component. Any combination of profile, Ispect, segment, and/or data item defined by the user according to different purposes of the end point application.

In one embodiment, a component may include one profile (A=1), two Ispecs (B=2), zero number of segments (C=0), and zero number of data items (D=0). In another embodiment, a component may include zero profile (A=0), one Ispec (B=1), two segments (C=2), three data items (D=3). In another embodiment, a component may include one profile (A=1), one Ispec (B=1), one segment (C=1), one data item (D=1). The above embodiments are in no way limiting the scope of the invention. There is no limitation on how many profiles, Ispecs, segments, and/or data items a component can have. A user may arbitrarily define a component according to a suitable use for an end point application.

It is also noted that two or more components e.g., 110 and 115) in one model file 105 may have different structures of data attributes (profile, Ispec, Segment, and/or data item). For example, in one embodiment, the model 105 includes two components (N=2). Component 1 may include one profile (A=1), two Ispecs (B=2), zero segment (C=0), and zero data items (D=0). Component 2 may include zero profile (A=0), one Ispec (B=1), two segments (C=2), three data items (D=3). The above embodiments are in no way limiting the scope of the invention. There is no limitation on how many profiles, Ispecs, segments, and/or data items a component can have. A user may arbitrarily define a component according to a suitable use for an end point application.

Figure 2:
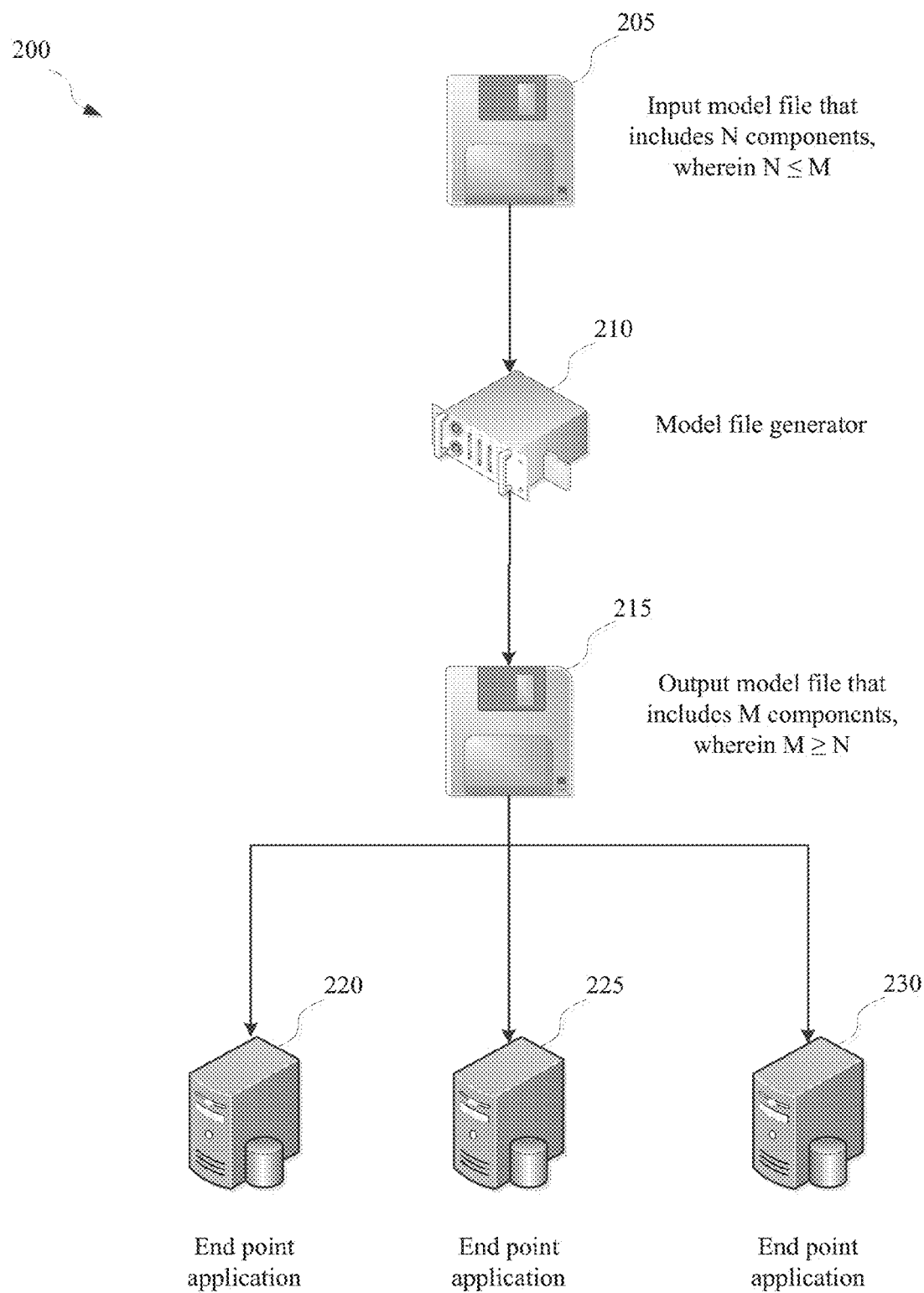
FIG. 2 is a schematic drawing illustrating a system of a model file generator according to one embodiment of the disclosure.

FIG. 2 is a schematic drawing illustrating a system 200 of a model file generator according to one embodiment of the disclosure. The system 200 may include model file 100 in FIG. 1. In some embodiments, the input model file 205 and/or the output model file 215 may be the model file 105.

Figure 3:
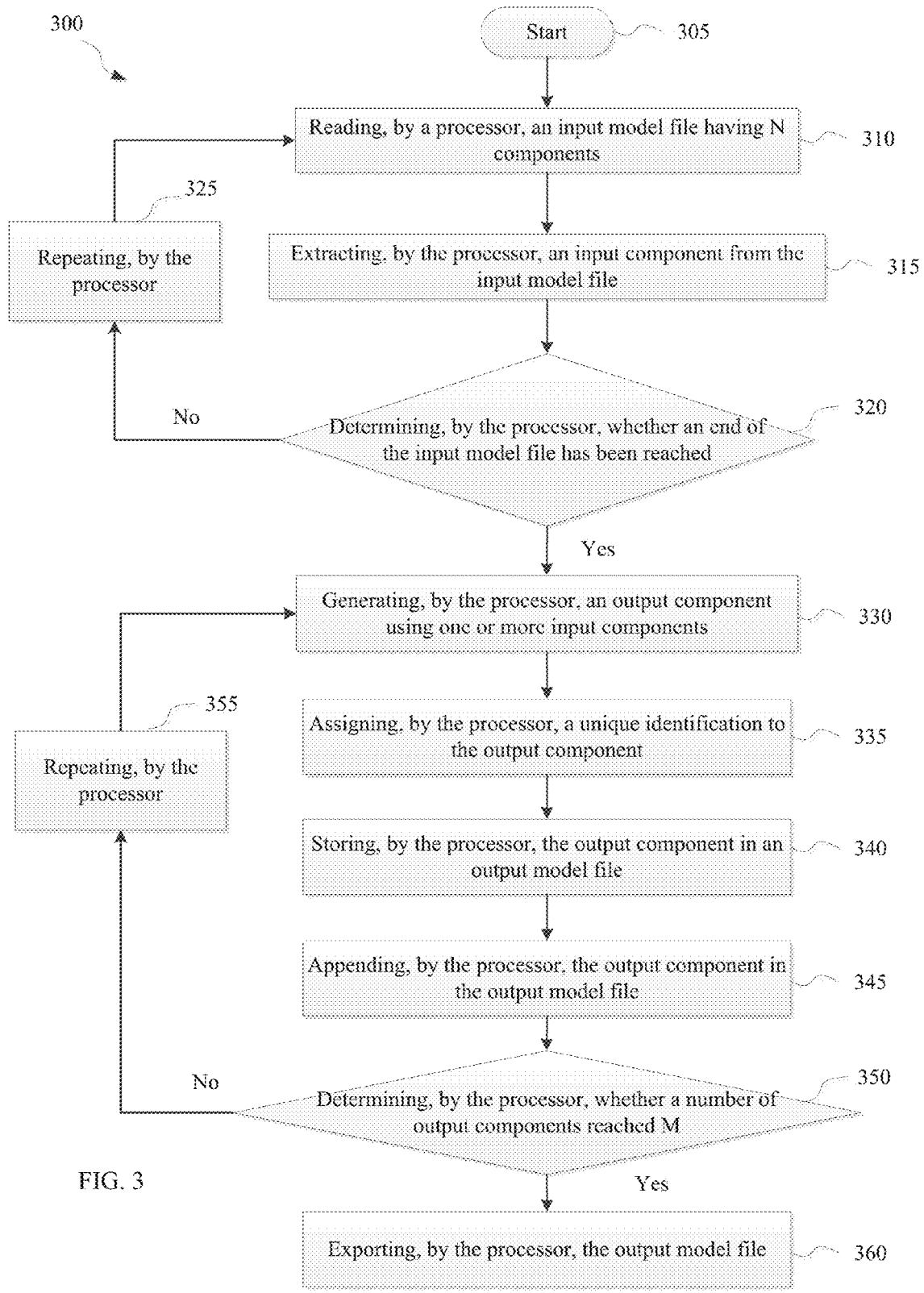
FIG. 3 is a flow chart illustrating a method implementing a model file generator according to one embodiment of the disclosure.

The system 200 may include the method 300 in FIG. 3. In one embodiment, the model file generator 210 may include the method 300. The system 200 may include the method 400 in FIG. 4. In one embodiment, the model file generator 210 may include the method 400. The system 200 may be included or used in combination with the system 500 in FIG. 5. In one embodiment, the end point applications 220, 225, 230 may be testing a database running on the system 500. The system 200 may be included or used in combination with the computer system 600 in FIG. 6. In one embodiment, the model file generator 210 may be a set of instructions executed by the CPU 602. The system 200 may be included or used in combination with the server 700 in FIG. 7A. In one embodiment, the model file generator 210 may be a set of instructions running in the emulated environment 708. The system 200 may be included or used in combination with the server 750 in FIG. 7B. In one embodiment, the model file generator 210 may be a part of the hardware 760.

As shown in FIG. 2, the system 200 of the model file generator includes an input model file 205, a model file generator 210, an output model file 215, and at least one end point application 220, 225, or 230.

As shown in FIG. 2, the input model file 205 includes N components, wherein N≤M (M is the number of components of the output model file 215). In one embodiment, the input model file 205 may be the model file 105 shown in FIG. 1, including all possible embodiments described thereof.

As shown in FIG. 2, the output model file 215 includes M components, wherein M N (N is the number of components of the input model file 205). In one embodiment, the output model file 215 may be the model file 105 shown in FIG. 1, including all possible embodiments described thereof.

As shown in FIG. 2, the model file generator 210 may generate the output model file 215 using the input model file 205. For example, method 300 in FIG. 3 may be an alternative embodiment of the model file generator 210.

In some other embodiments, the model file generator 210 can generate an output model file 215 without using an input model file 205. In such embodiments, the input model file 205 may be optional. For example, method 400 in FIG. 4 would be one of such embodiments that generate output model file without using an input model file.

In one embodiment, the model file generator 210 can be a standalone apparatus. In another embodiment, the model file generator 210 can be an integrated circuit (IC) connected to a circuit hoard. In one embodiment, the model file generator 210 can be an electronic circuit embedded in another IC. In one embodiment, the model file generator 210 can be a set of instructions executed by a general purpose processor, e.g., CPU 602, CPU 713, etc.

As shown in FIG. 2, the system 200 includes end point applications 220, 225, and 230. In some embodiments, the end point applications may include database testing, database debugging, software quality control, or the like. In one embodiment, the end point application 220, 225, and 230 may be testing a database running on the system 500. In one embodiment, the end point application 220, 225, and 230 may be testing a database running on the computer system 600. In one embodiment, the end point application 220, 225, and 230 may be testing a database running on the server 700 and/or 750.

FIG. 3 is a flow chart illustrating a method 300 implementing a model file generator according to one embodiment of the disclosure. The method 300 may include the model file 100 in FIG. 1. In one embodiment, the input model file at block 310 and/or the output model file at block 340 may be the model file 105. The method 300 may be included in the system 200 in FIG. 2. In one embodiment, the method 300 may be a set of instructions executed on the model file generator 210. The method 300 may be used in combination or as an alternative of method 400 in FIG. 4. In one embodiment, the method 300 may be an alternative embodiment of the method 400. The method 300 may be included in the system 500 in FIG. 5. In one embodiment, the method 300 may be a set of instructions executed on the server 502. The method 300 may be included in the computer system 600 in FIG. 6. In one embodiment, the method 300 may be a set of instructions executed by the CPU 602. The method 300 may be included in the server 700 in FIG. 7A. In one embodiment, the method 300 may be the program 710. The method 300 may be included in the server 750 in FIG. 7B. In one embodiment, the method 300 may be a set of instructions executed by the CPU 713.

As shown in FIG. 3, the method starts at block 305. The method 300 proceeds to block 310, which includes reading, by a processor, an input model file having N components. The method 300 proceeds to block 315, which includes extracting, by the processor, an input component from the input model file. The method 300 proceeds to block 320, which includes determining, by the processor, whether an end of the input model file has been reached. The method 300 proceeds to block 325, if 320 has not reached an end of the input model file, which includes repeating, by the processor. The method 300 proceeds to block 330, if 320 has reached an end of the input model file, which includes generating, by the processor, an output component using one or more input components. The method 300 proceeds to block 335, which includes assigning, by the processor, a unique identification to the output component. The method 300 proceeds to 340, which includes storing, by the processor, the output component in an output model file. The method 300 proceeds to 345, which includes appending, by the processor, the output component in the output model file. The method 300 proceeds to 350, which includes determining, by the processor, whether a number of output components reached M. The method 300 proceeds to 355, if the number of output components has not reached M, which includes repeating, by the processor. The method 300 proceeds to 335, if the number of output components reached M, which includes exporting, by the processor, the output model file.

At block 310, in one embodiment, the input model file of 310 may be the input model file of 205. In another embodiment, the input model file of 310 may be the model file 105. In one embodiment, the input model file at 310 may include N components, and the output model file at 340 may include M components, wherein M≥N.

At block 315, an input component is extracted by the processor. In some embodiment, the input components extracted at 315 may be the components 110, 115, and/or 120, including all possible embodiments disclosed in FIG. 1.

At block 320, the method determines whether an end of the input model file has been reached. If an end of the input model file is reached, the method 300 proceeds to block 330. If an end of the input model file is not reached, the method 300 proceeds to block 325.

At block 325, the method 300 goes back block 310, repeating the process of extracting components from an input file. In one embodiment, the method may include a counter, wherein the counter is initially set to zero and increases by one each time 325 is executed. In one embodiment, in C language, the counter may be expressed as: counter=counter+1.

At block 330, the method 300 generates an output component using one or more input components. In one embodiment, the method generates an output component by copying the input component. In some other embodiments, an output component may be generated by permuting, alternating, rearranging, or the like of the input components.

At block 335, the method 300 assigns a unique identification to the output component. The unique identification at block 335 may include character, number, symbol, or the like.

At block 340, the method 300 stores the output component generated in an output model file. In one embodiment, the output model file at 340 may be the output model file of 215. In another embodiment, the output model file at 340 may be the model file 105. In one embodiment, the output model file at 340 may include M components, and the input model file at 310 may include N components, wherein M≥N. In one embodiment M may be a number set by the user.

At block 345, the method appends the output component generated to the output model file. In one embodiment, the newly generated output component is appended to the end of the output model file. In another embodiment, the newly generated output component is inserted in the middle of an output model file. In yet another embodiment, the newly generated output component is inserted at the beginning of an output model file.

At block 350, in one embodiment, M can be a number set by the user. The user may set M to a number that is suitable for the purpose of an end point application, database debugging, software quality control, etc. In one embodiment, M can be equal to N. In another embodiment, M can be greater than N. In yet another embodiment, M can be much greater than N, e.g., M>>N.

At block 350, if a number of output components has reached M, the method 300 proceeds to block 360, which includes exporting, by the processor, the output model file.

At block 350, if a number of output components has not reached M, the method 300 proceeds to block 355, which includes repeating, by the processor. As shown in FIG. 3, at block 355, the method proceeds back to block 330, repeating the process to generate an output component in the output file.

At block 360, the method 300 exports the output model file. In one embodiment, the method 300 may export the output model file to an end point application, e.g., end point applications 220, 225, and/or 230 in FIG. 2. In one embodiment, the method 300 may export the output model file to a database that has the capability to read the output model file.

Figure 4:
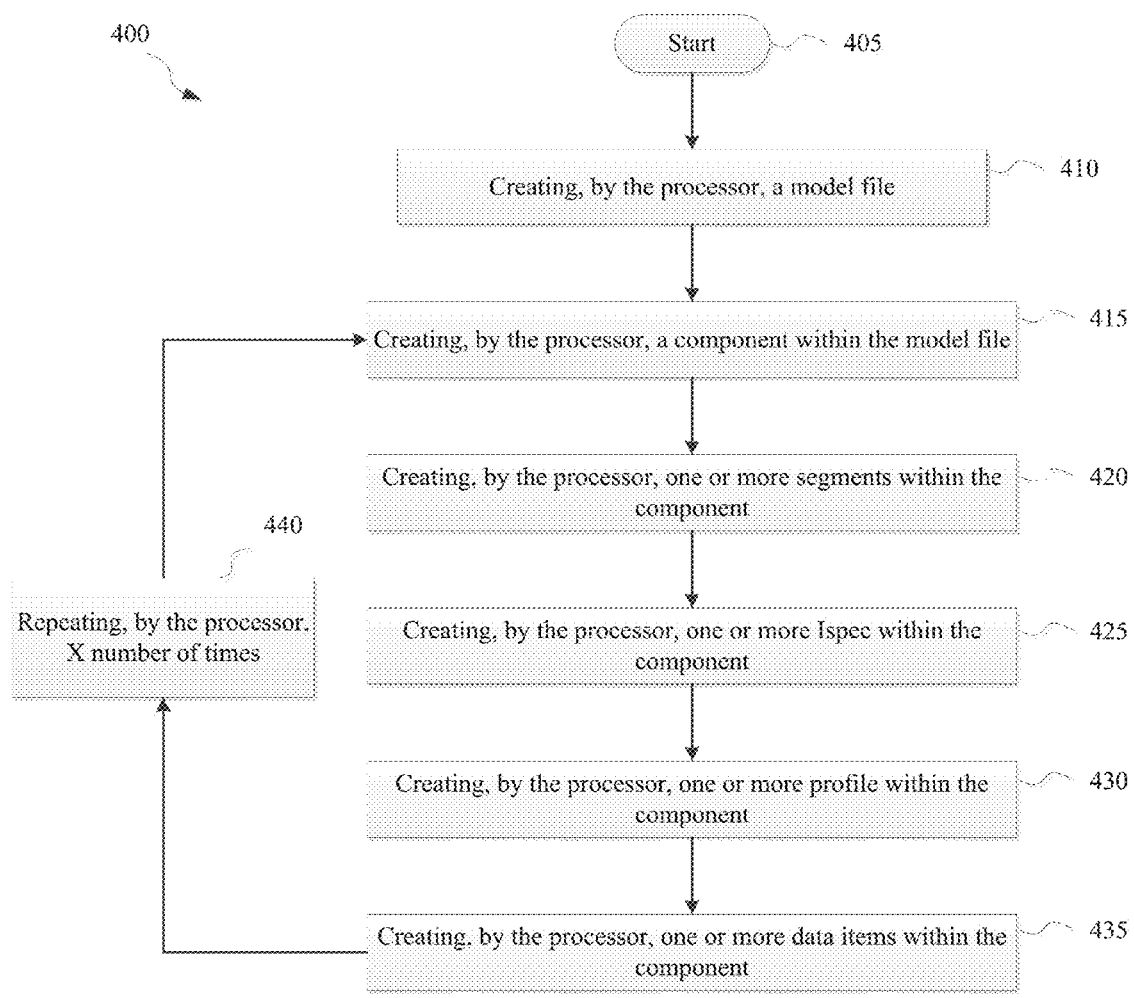
FIG. 4 is a flow chart illustrating a method implementing a model file generator according to one embodiment of the disclosure.

FIG. 4 is a flow chart illustrating a method 400 implementing a model file generator according to one embodiment of the disclosure. The method 400 may include the model file 100 in FIG. 1. In one embodiment, the model file at block 410 may be the model file 105. The method 400 may be included in the system 200 in FIG. 2. In one embodiment, the method 400 may be a set of instructions executed on the model file generator 210. The method 400 may be used in combination or as an alternative of method 300 in FIG. 3. In one embodiment, the method 400 may be an alternative embodiment of the method 300. The method 400 may be included in the system 500 in FIG. 5. In one embodiment, the method 400 may be a set of instructions executed on the server 502. The method 400 may be included in the computer system 600 in FIG. 6. In one embodiment, the method 400 may be a set of instructions executed by the CPU 602. The method 400 may be included in the server 700 in FIG. 7A. In one embodiment, the method 400 may be the program 710. The method 400 may be included in the server 750 in FIG. 7B. In one embodiment, the method 400 may be a set of instructions executed by the CPU 713.

As shown in FIG. 4, the method 400 starts at block 405. The method 400 proceeds to block 410, which includes creating, by the processor, a mode file. The method 400 proceeds to block 415, which includes creating, by the processor, a component within the model file. The method 400 proceeds to 420, which includes creating, by the processor, one or more segments within the component. The method 400 proceeds to 425, which includes creating, by the processor, one or more Ispec within the component. The method 400 proceeds to 430, which includes creating, by the processor, one or more profile within the component. The method 400 proceeds to 435, which includes creating, by the processor, one or more data items within component. The method 400 proceeds to block 440, which includes repeating, by the processor, X number of times.

In contrast to the method 300, the method 400 may generate an output model file without using an input model file. In one embodiment, the method 400 may be an alternative embodiment of the model file generator 210. In another embodiment, the method 400 may be an alternative embodiment of the method 300.

At 410, the method 400 creates a model file. In one embodiment, the model file at 410 may be the model file 105. In another embodiment, the model file at 410 may be the output model file 215. In another embodiment, the model file at 410 may be the output model file at 340.

At 415, the method 400 creates a component within the model file. In one embodiment, the component at 415 may be the component 110, 115, or 120. In another embodiment, the component at 415 may be the output component at 330. In one embodiment, a component at 415 may be a collection of database attributes. In one embodiment, a component at 415 may include a business resource such as a customer, product, vendor, or the like. In one embodiment, a component at 415 may be a storage of data about a business resource such as a customer, product, vendor, or the like. In one embodiment, a component at 415 may include screen layout and associated operational logics (e.g., Pre-Screen logic, Pre-LINC logic, and Main logic).

At 420, the method 400 creates one or more segments within the component. In one embodiment, the segment at 420 may be the segment in component 110, 115, or 120. In one embodiment, a segment at 420 is a database attribute within a component. In one embodiment, a segment at 420 may refer to a data segment (table data storage), an index segment, a rollback segment, a temporary segment, or the like.

At 425, the method 400 creates one or more Ispecs within the component. In one embodiment, an Ispec at 425 may be the Ispec in component 110, 115, or 120. In one embodiment, an Ispec at 425 may be a database attribute within a component. In one embodiment, an Ispec at 425 may be a contraction of the term interface specification. In one embodiment, an Ispec at 425 may include specifications of graphical user interface, e.g., screen size, window location, input/output buttons, drop downs, database structure, business logic, or the like.

At 430, the method 400 creates one or more profile within the component. In one embodiment, the profile at 430 may be a database attribute within a component. In one embodiment, the profile at 430 may be a business profile over a component. In one embodiment, the profile at 430 may include contact address, contact phone number, name of the CEO, a description of the nature of a business, or the like of a client.

At 430, the method creates one or more data items within the component. In one embodiment, a data item at 430 may be a database attribute within a component. In one embodiment, a data item at 430 may be a data record of a database.

Figure 5:
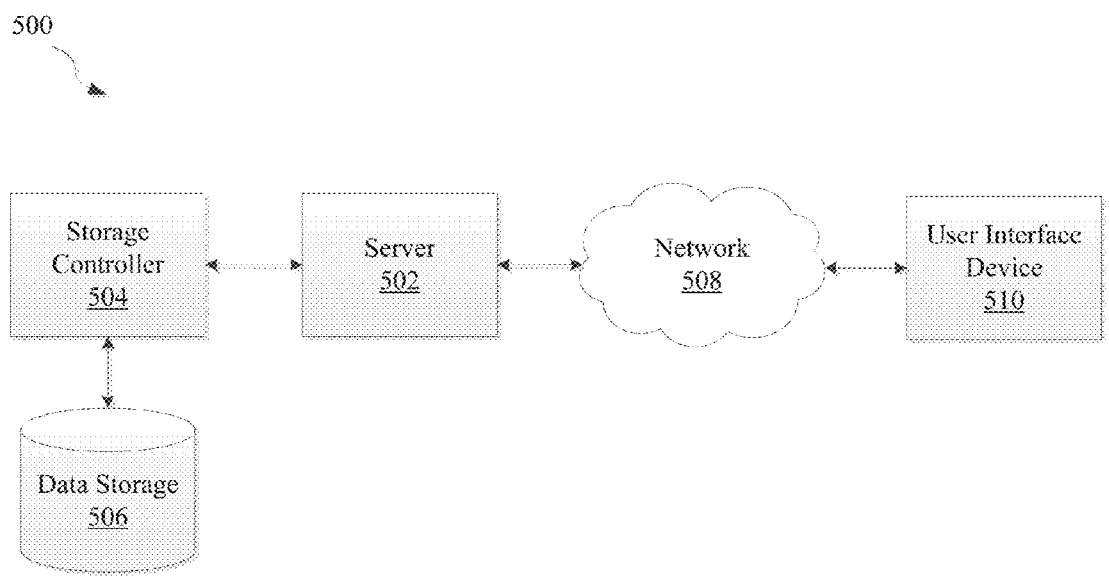
FIG. 5 is a block diagram illustrating a system according to one embodiment of the disclosure according to one embodiment of the disclosure.

FIG. 5 is a block diagram illustrating a system 500 according to one embodiment of the disclosure according to one embodiment of the disclosure. FIG. 5 illustrates a system 500 for obtaining access to database files in a computing system according to one embodiment of the disclosure. The system 500 may include a server 502, a data storage device 506, a network 508, and an user interface device 510. The server 502 may also be a hypervisor-based system executing one or more guest partitions hosting operating systems with modules having server configuration information. In a further embodiment, the system 500 may include a storage controller 504, or a storage server configured to manage data communications between the data storage device 506 and the server 502 or other components in communication with the network 508. In an alternative embodiment, the storage controller 504 may be coupled to the network 508.

In one embodiment, the user interface device 510 is referred to broadly and is intended to encompass a suitable processor-based device such as a desktop computer, a laptop computer, a personal digital assistant (PDA) or tablet computer, a smartphone or other mobile communication device having access to the network 508. In a further embodiment, the user interface device 510 may access the Internet or other wide area or local area network to access a web application or web service hosted by the server 502 and may provide an user interface for enabling an user to enter or receive information.

The network 508 may facilitate communications of data between the server 502 and the user interface device 510. The network 508 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

In one embodiment, the user interface device 510 accesses the server 502 through an intermediate sever (not shown). For example, in a cloud application the user interface device 510 may access an application server. The application server fulfills requests from the user interface device 510 by accessing a database management system (DBMS). In this embodiment, the user interface device 510 may be a computer or phone executing a Java application making requests to a JBOSS server executing on a Linux server, which fulfills the requests by accessing a relational database management system (RDMS) on a mainframe server.

Figure 6:
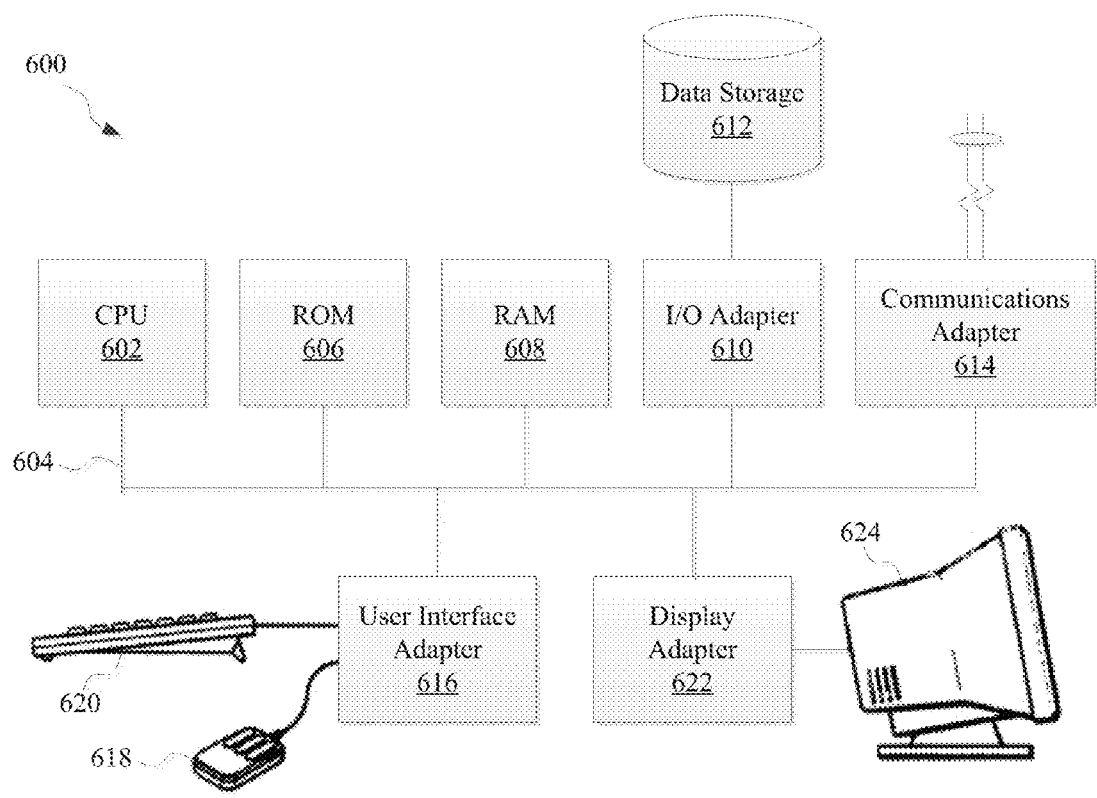
FIG. 6 is a block diagram illustrating a computer system according to one embodiment of the disclosure.

FIG. 6 is a block diagram illustrating a computer system 600 according to one embodiment of the disclosure. FIG. 6 illustrates a computer system 600 adapted according to certain embodiments of the server 502 and/or the user interface device 510. The central processing unit ("CPU") 602 is coupled to the system bus 604. The CPU 602 may be a general purpose CPU or microprocessor, graphics processing unit ("GPU"), and/or microcontroller. The present embodiments are not restricted by the architecture of the CPU 602 so long as the CPU 602, whether directly or indirectly, supports the operations as described herein. The CPU 602 may execute the various logical instructions according to the present embodiments.

The computer system 600 may also include random access memory (RAM) 608, which may be synchronous RAM (SRAM), dynamic RAM (DRAM), synchronous dynamic RAM (SDRAM), or the like. The computer system 600 may utilize RAM 608 to store the various data structures used by a software application. The computer system 600 may also include read only memory (ROM) 606 which may be PROM, EPROM, EEPROM, optical storage, or the like. The ROM may store configuration information for booting the computer system 600. The RAM 608 and the ROM 606 hold user and system data, and both the RAM 608 and the ROM 606 may be randomly accessed.

The computer system 600 may also include an I/O adapter 610, a communications adapter 614, an user interface adapter 616, and a display adapter 622. The I/O adapter 610 and/or the user interface adapter 616 may, in certain embodiments, enable an user to interact with the computer system 600. In a further embodiment, the display adapter 622 may display a graphical user interface (GUI) associated with a software or web-based application on a display device 624, such as a monitor or touch screen.

The I/O adapter 610 may couple one or more storage devices 612, such as one or more of a hard drive, a solid state storage device, a flash drive, a compact disc (CD) drive, a floppy disk drive, and a tape drive, to the computer system 600. According to one embodiment, the data storage 612 may be a separate server coupled to the computer system 600 through a network connection to the I/O adapter 610. The communications adapter 614 may be adapted to couple the computer system 600 to the network 508, which may be one or more of a LAN, WAN, and/or the Internet. The user interface adapter 616 couples user input devices, such as a keyboard 620, a pointing device 618, and/or a touch screen (not shown) to the computer system 600. The display adapter 622 may be driven by the CPU 602 to control the display on the display device 624. Any of the devices 602-622 may be non-emulated and/or emulated.

The applications of the present disclosure are not limited to the architecture of computer system 600. Rather the computer system 600 is provided as an example of one type of computing device that may be adapted to perform the functions of the server 502 and/or the user interface device 610. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 700 may be virtualized for access by multiple users and/or applications.

Figure 7A:
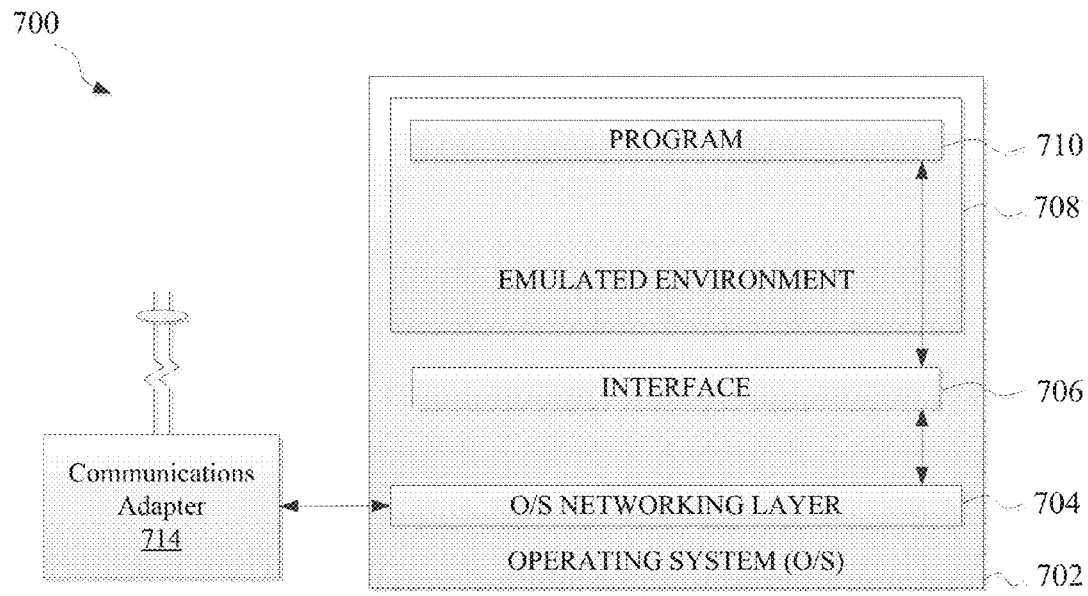
FIG. 7A is a block diagram illustrating a server hosting an emulated software environment for virtualization according to one embodiment of the disclosure.

FIG. 7A is a block diagram illustrating a server 700 hosting an emulated software environment for virtualization according to one embodiment of the disclosure. An operating system 702 executing on a server 700 includes drivers for accessing hardware components, such as a networking layer 704 for accessing the communications adapter 714. The operating system 702 may be, for example, Linux or Windows. An emulated environment 708 in the operating system 702 executes a program 710, such as Communications Platform (CPComm) or Communications Platform for Open Systems (CPCommOS). The program 710 accesses the networking layer 704 of the operating system 702 through a non-emulated interface 706, such as extended network input output processor (XNIOP). The non-emulated interface 706 translates requests from the program 710 executing in the emulated environment 708 for the networking layer 704 of the operating system 702.

Figure 7B:
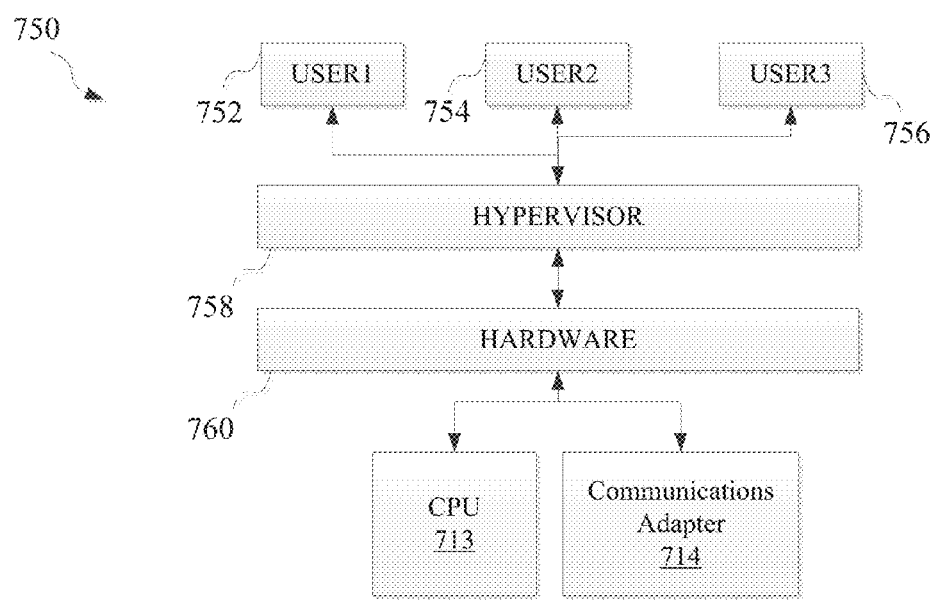
FIG. 7B is a block diagram illustrating a server hosing an emulated hardware environment according to one embodiment of the disclosure.

In another example, hardware in a computer system may be virtualized through a hypervisor. FIG. 7B is a block diagram illustrating a server 750 hosting an emulated hardware environment according to one embodiment of the disclosure. Users 752, 754, 756 may access the hardware 760 through a hypervisor 758. The hypervisor 758 may be integrated with the hardware 758 to provide virtualization of the hardware 758 without an operating system, such as in the configuration illustrated in 7A. The hypervisor 758 may provide access to the hardware 758, including the CPU 713 and the communications adaptor 714.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
    reading, by a processor, an input model file, the input model file including N number of input components comprising a first plurality of database attributes;
    extracting, by the processor, the input components from the input model file;
    generating, by the processor, M number of output components comprising a second plurality of database attributes, using the input components;
    storing, by the processor, a first output model file including the M number of output components, the first output model file being configured to operate in a first database management endpoint application;
    generating, by the processor, P number of output components comprising a third plurality of database attributes, using the input components; and
    storing, by the processor, a second output model file including the P number of output components, the second output model file being configured to operate in a second database management endpoint application separate from the first endpoint application,
    wherein M is larger than N, and P is larger than N.

2. The method of claim 1, further including
    determining, by the processor, whether an end of the input model file has been reached.

3. The method of claim 1, further including
    assigning, by the processor, a unique identification to each output component.

4. The method of claim 1, further including
    appending, by the processor, each of the M output components in the first output model file.

5. The method of claim 1, further including
    exporting, by the processor, the first output model file.

6. The method of claim 5, wherein
    the first output model file is exported to a database that has the capability to read the first output model file.

7. A computer program product, comprising:
    a non-transitory computer-readable medium comprising instructions which, when executed by a processor of a computing system, cause the processor to perform the steps of:
        reading an input model file, the input model file including N number of input components comprising a first plurality of database attributes;
        extracting the input component from the input model file;
        generating M number of output components comprising a second plurality of database attributes, using the input components;
        storing a first output model file including the M number of output components, the first output model file being configured to operate in a first database management endpoint application;
        generating P number of output components comprising a third plurality of database attributes, using the input components; and
        storing a second output model file including the P number of output components, the second output model file being configured to operate in a second database management endpoint application separate from the first endpoint application,
        wherein M is larger than N, and P is larger than N.

8. The computer program product of claim 7, wherein the medium further comprises instructions to cause the processor to perform the step of:
    determining whether an end of the input model file has been reached.

9. The computer program product of claim 7, wherein the medium further comprises instructions to cause the processor to perform the step of:
    assigning a unique identification to each output component.

10. The computer program product of claim 7, wherein the medium further comprises instructions to cause the processor to perform the step of:
   appending each of the M output components in the first output model file.

11. The computer program product of claim 7, wherein the medium further comprises instructions to cause the processor to perform the step of:
   exporting the first output model file.

12. The computer program product of claim 11, wherein the first output model file is exported to a database that has the capability to read the first output model file.

13. An apparatus, comprising:
   a memory; and
   a processor coupled to the memory, the processor configured to execute the steps of:
      reading an input model file, the input model file including N number of input components comprising a first plurality of database attributes;
      extracting the input components from the input model file;
      generating M number of output components comprising a second plurality of database attributes, using the input components; and
      storing a first output model file including the M number of output components, the first output model file being configured to operate in a first database management endpoint application;
   generating P number of output components comprising a third plurality of database attributes, using the input components; and
   storing a second output model file including the P number of output components, the second output model file being configured to operate in a second database management endpoint application separate from the first endpoint application,
   wherein M is larger than N, and P is larger than N.

14. The apparatus of claim 13, the processor is further configured to perform the step of:
   determining whether an end of the input model file has been reached.

15. The apparatus of claim 13, the processor is further configured to perform the step of:
   assigning a unique identification to each output component.

16. The apparatus of claim 13, the processor is further configured to perform the step of:
   appending each of the M output components in the first output model file.

17. The apparatus of claim 13, the processor is further configured to perform the step of:
   exporting the first output model file.

18. The method according to claim 1, wherein the first endpoint application is a first emulated environment, the second endpoint application is a second emulated environment.

19. The computer program product according to claim 7, wherein the first endpoint application is a first emulated environment, the second endpoint application is a second emulated environment.

20. The apparatus according to claim 13, wherein the first endpoint application is a first emulated environment, the second endpoint application is a second emulated environment.

* * * * *